US011226104B2

(12) United States Patent
Widmer

(10) Patent No.: US 11,226,104 B2
(45) Date of Patent: Jan. 18, 2022

(54) MODULAR OUTDOOR FIREPLACE AND BRICK OVEN

(71) Applicant: Round Grove Products, LLC, Dalton, OH (US)

(72) Inventor: Scott Widmer, Dalton, OH (US)

(73) Assignee: ROUND GROVE PRODUCTS, LLC, Dalton, OH (US)

( * ) Notice: Subject to any disclaimer, the term of this patent is extended or adjusted under 35 U.S.C. 154(b) by 109 days.

(21) Appl. No.: 16/864,460

(22) Filed: May 1, 2020

(65) Prior Publication Data

US 2020/0348026 A1  Nov. 5, 2020

Related U.S. Application Data

(60) Provisional application No. 62/841,299, filed on May 1, 2019.

(51) Int. Cl.
| | |
|---|---|
| *F24B 1/181* | (2006.01) |
| *F24B 1/182* | (2006.01) |
| *F24B 7/02* | (2006.01) |
| *F24B 1/195* | (2006.01) |
| *F24B 1/189* | (2006.01) |

(52) U.S. Cl.
CPC .............. *F24B 1/181* (2013.01); *F24B 1/182* (2013.01); *F24B 1/189* (2013.01); *F24B 1/1955* (2013.01); *F24B 7/02* (2013.01)

(58) Field of Classification Search
CPC ............. F23B 1/22; F23B 1/181; F23B 1/182
See application file for complete search history.

(56) References Cited

U.S. PATENT DOCUMENTS

| | | | |
|---|---|---|---|
| 4,478,208 A * | 10/1984 | Pitha | F24B 1/1885 110/336 |
| 6,615,818 B1 | 9/2003 | Jimka et al. | |
| 6,748,939 B1 | 6/2004 | Gober | |
| 10,435,881 B1 * | 10/2019 | Ventriglia | F24B 1/181 |
| 2009/0302725 A1 | 12/2009 | Rogers et al. | |
| 2018/0142895 A1 | 5/2018 | Widmer | |
| 2021/0095852 A1 * | 4/2021 | Jones | F24B 5/087 |

FOREIGN PATENT DOCUMENTS

FR        2717566 A1     9/1995

* cited by examiner

*Primary Examiner* — David J Laux
(74) *Attorney, Agent, or Firm* — Jacob M. Ward; Ward Law Office LLC

(57) ABSTRACT

A modular outdoor fireplace and brick oven system is configured to be easily transportable and assembled. The modular system has a chimney unit and at least one modular unit. The modular unit may be one of an oven unit and a fireplace unit. The chimney unit and at least one modular unit are uniquely aligned using a plurality of alignment means. The alignment means are disposed between the assembled units on a top surface and a bottom surface of each modular unit and the chimney unit. The modular units are designed to allow airflow from each modular unit to reach the chimney unit. The modular units may further have lifting holes designed to easily move the modular units or assembled system with a forklift, lifting straps, and slings.

16 Claims, 7 Drawing Sheets

MODULAR OUTDOOR FIREPLACE AND BRICK OVEN

CROSS-REFERENCE TO RELATED APPLICATIONS

This application claims benefit of U.S. Provisional Patent Application Ser. No. 62/841,299, filed May 1, 2019. The entire disclosure of the above application is hereby incorporated herein by reference.

FIELD

The present disclosure generally relates to outdoor fireplaces and brick ovens, and more particularly, to the configuration of outdoor fireplaces and brick ovens.

BACKGROUND

Outdoor fireplaces have become increasingly popular, either as a landscape feature or as part of an outdoor kitchen. However, construction of an outdoor gas fireplace is labor intensive and consequently expensive. Typical outdoor gas fireplaces are constructed from brick, block, or stone components, which are custom built for each installation. Often, fireplace components have not been constructed at a manufacturing facility, and brick or stone veneers are normally manually applied at the jobsite.

Outdoor pizza ovens that use solid fuel (e.g. wood, charcoal, pellets, charcoal briquettes, and coal) are also increasingly popular. However, these outdoor brick ovens often fail to provide adequate and consistent cooking temperatures. Traditional brick ovens are also often large, heavy, and built-in fixtures, for example, assembled by a skilled craftsman in the backyard of a user. These brick ovens are not customizable once the units are installed. The user would have to purchase a new system should they desire additional features.

There is a continuing need for a modular outdoor fireplace that is customizable to the needs of a user. Desirably, the modular outdoor fireplace and brick oven is configured to be easily transportable and assembled without requiring the intervention of a skilled craftsman.

SUMMARY

In concordance with the instant disclosure, a modular outdoor fireplace that is customizable to the needs of a user, and which is configured to be easily transportable and assembled without requiring the intervention of a skilled craftsman, has been surprisingly discovered.

In one embodiment, a modular system has a first modular unit and a chimney unit. The first modular unit has a main body with a top surface. The top surface includes a first alignment means. The first modular unit is at least one of a fireplace unit and an oven unit. The chimney unit is disposed atop the first modular unit. The chimney unit having a bottom surface with second alignment means. The first alignment means of the first modular unit cooperates with the second alignment means of the chimney unit and holds the chimney unit in a predetermined aligned position relative to the first modular unit.

In another embodiment, a modular system as described hereinabove may be in the form of a kit. The kit may include a chimney unit and a first modular unit, which are separate from each other as provided and further include associated fastening means.

In a further embodiment, a method for constructing a modular system includes the step of providing a first modular unit. The first modular unit includes a main body and a top surface. The top surface of the first modular unit has a first alignment means. The first modular unit at least one of a fireplace unit and an oven unit. Then, providing a chimney unit. The chimney unit is designed to be disposed atop the first modular unit. The chimney unit has a bottom surface with a second alignment means. The second alignment means of the chimney unit cooperates with the first alignment means of the first modular unit to hold the chimney unit in a predetermined aligned position relative to the first modular unit. Next, selecting a location for the modular system. Afterwards, transporting the first modular unit and the chimney unit to the location. Then, placing the first modular unit at the location. Next, aligning the first alignment means of the modular unit with the second alignment means of the chimney unit. Afterwards, disposing the chimney unit atop the modular unit in the predetermined aligned position.

In an exemplary embodiment of the modular outdoor fireplace and brick oven system includes a plurality of modular units, which may include a fireplace unit, an oven unit, and a chimney unit, as non-limiting examples. Advantageously, the various modular units may be arranged in multiple combinations. The various arrangements provide a consumer the ability to create a preferred outdoor fireplace unit. Further, each of the modular units are configured to be transported as separate pieces thus allowing for easy transport, arrangement, and construction of the system.

Each modular unit may have a main body. The main body of each modular unit may be defined by a framework assembly covered by a refractory heat resistant mortar. In particular, the framework assembly includes a framework of steel channel members, as described further hereinbelow. The steel channel members may define chambers within the framework assembly for the plurality of modular units.

Each modular unit may be configured to connect to at least one other modular unit. Advantageously, the modular units may be arranged in any suitable location by a user. The user may include any suitable number of modular units arranged in any suitable layout.

The fireplace unit may include a fireplace box and a base. The fireplace firebox may be formed from noncombustible magnesium oxide board and refractory bricks. One of ordinary skill in the art may select other suitable refractory materials for the fireplace firebox, as desired.

The fireplace firebox may have a rear wall, a bottom wall, and a pair of side walls. Each wall may be created using a plurality of steel channel members covered by a noncombustible board, and refractory bricks. The combination of noncombustible board and refractory bricks may protect the steel channel members from heat generated during combustion. The noncombustible board may be secured to the steel channel members with fasteners such as screws, bolts, rivets, as non-limiting examples. A skilled artisan may select any suitable construction materials for the fireplace firebox, as desired.

In another embodiment, the fireplace firebox may be configured for burning wood and other suitable fireplace media. In further embodiments, the fireplace firebox may be configured to be connected to a gaseous fuel source. A skilled artisan may select any suitable fireplace medium for the fireplace firebox, as desired.

The base may be disposed beneath the fireplace firebox. Advantageously, the base may be configured to facilitate a transport of the fireplace unit, for example, from a location of manufacture to the location of an end user.

The base may include a pair of holes formed in the front wall of the fireplace unit. Advantageously, the pair of holes may be configured to receive at least one of forklifts, slings, and straps for lifting and positioning the fireplace unit.

In a particular example, the holes may be defined by a pair of box-iron channels. The pair of box iron channels may be connected to the framework assembly. In other examples (not shown), the box-iron channels may project outwardly from the main body of the fireplace unit to define a step. Other suitable means of forming the holes to securely and conveniently move the fireplace unit are also considered within the scope of the present disclosure.

The oven unit may have a cooking chamber. The cooking chamber may have a plurality of side walls, a cooking surface, and a domed ceiling. The cooking chamber may be configured to burn solid fuel, such as, wood, charcoal, pellets, charcoal briquettes, and coal, as non-limiting examples. The cooking chamber may facilitate the cooking of edible goods, such as pizza. A skilled artisan may select any suitable fuel source for the cooking chamber, as desired.

Each of the sidewalls, the cooking surface, and the domed ceiling may be fabricated from refractory materials. The domed ceiling may be fabricated from refractory bricks disposed in an arch. Advantageously, the domed ceiling may trap and radiates heat into the cooking chamber providing optimized temperatures when cooking.

In one non-limiting example, the plurality of sidewalls and the cooking surface may be formed from noncombustible magnesium oxide board and refractory bricks. The noncombustible board may be secured to the steel channel members with fasteners such as screws, bolts, rivets, or the like. The refractory bricks may be laid atop the noncombustible board. A skilled artisan may select any suitable construction materials for the oven unit, as desired.

The oven unit may have a pair of holes formed in the front wall of the oven unit. Advantageously, the pair of holes may be configured to receive at least one of forklifts, slings, and straps for lifting and positioning the fireplace unit.

In a particular example, the holes may be defined by a pair of box-iron channels. Other suitable means of forming the holes to securely and conveniently move the oven unit are also considered within the scope of the present disclosure.

The modular outdoor fireplace and brick oven system may have a chimney unit. The chimney unit may have a chimney flue. The chimney flue (not shown) may be disposed in the framework assembly of the chimney unit. Advantageously, the chimney unit may allow hot smoke and gasses to flow from the system through the chimney unit and away from a user of the system.

Although not specifically shown, it should be understood that the chimney flue may include a chimney damper or flap inside or at a top of the chimney flue, which can be adjusted manually to allow smoke to escape or air to enter. The chimney damper may be formed of metal or ceramic so as to tolerate the heat from the smoke and hot gases. The chimney damper may be opened and closed through a variety of suitable mechanisms, for example, a latch, a pull chain, or a handle, as desired.

The chimney unit may also have a pair of holes formed the chimney unit. Advantageously, the pair of holes may be configured to receive at least one of forklifts, slings, and straps for lifting and positioning the fireplace unit.

In a particular example, the holes may be defined by a pair of box-iron channels. The pair of box iron channels may be connected to the framework assembly. Other suitable means of forming the holes to securely and conveniently move the chimney unit are also considered within the scope of the present disclosure.

In a further embodiment, the chimney unit may not include the pair of holes for lifting the chimney unit. Advantageously, the chimney unit without the holes for lifting provides less obstruction and better airflow from the first modular unit such as the fireplace unit and the oven unit.

In operation, a plurality of units of the modular outdoor fireplace and brick oven system may be provided. The units may be transported as separate pieces to the desired location of a user. The user may select the desired modular units. The desired units may be assembled according to the wants and needs of the user. The modular units may be fastened together via screws and bolts and corresponding apertures on the modular units. A skilled artisan may select any suitable method for fastening the modular units, as desired.

It should be understood that the modular outdoor fireplace and brick oven system allows the user to customize the system to their needs, while also facilitating transportation and assembly of the system.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

Figure 5:
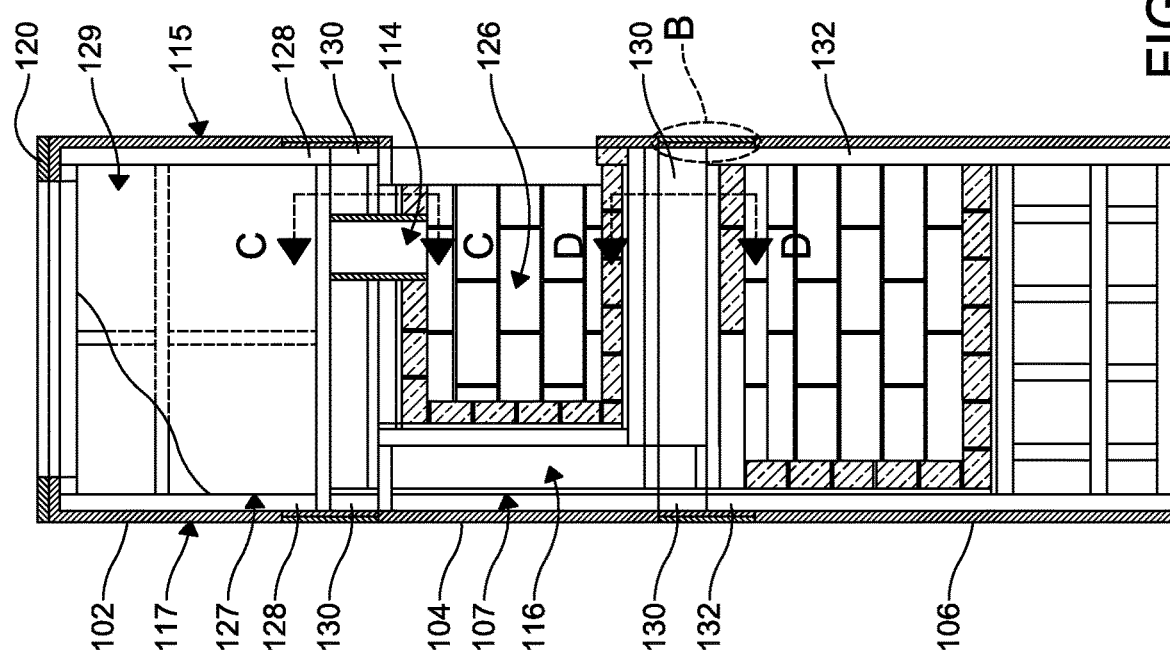
FIG. 5 is a cross-sectional side elevational view of the modular outdoor fireplace and brick oven system taken at section A-A in FIG. 1.
Figure 8:
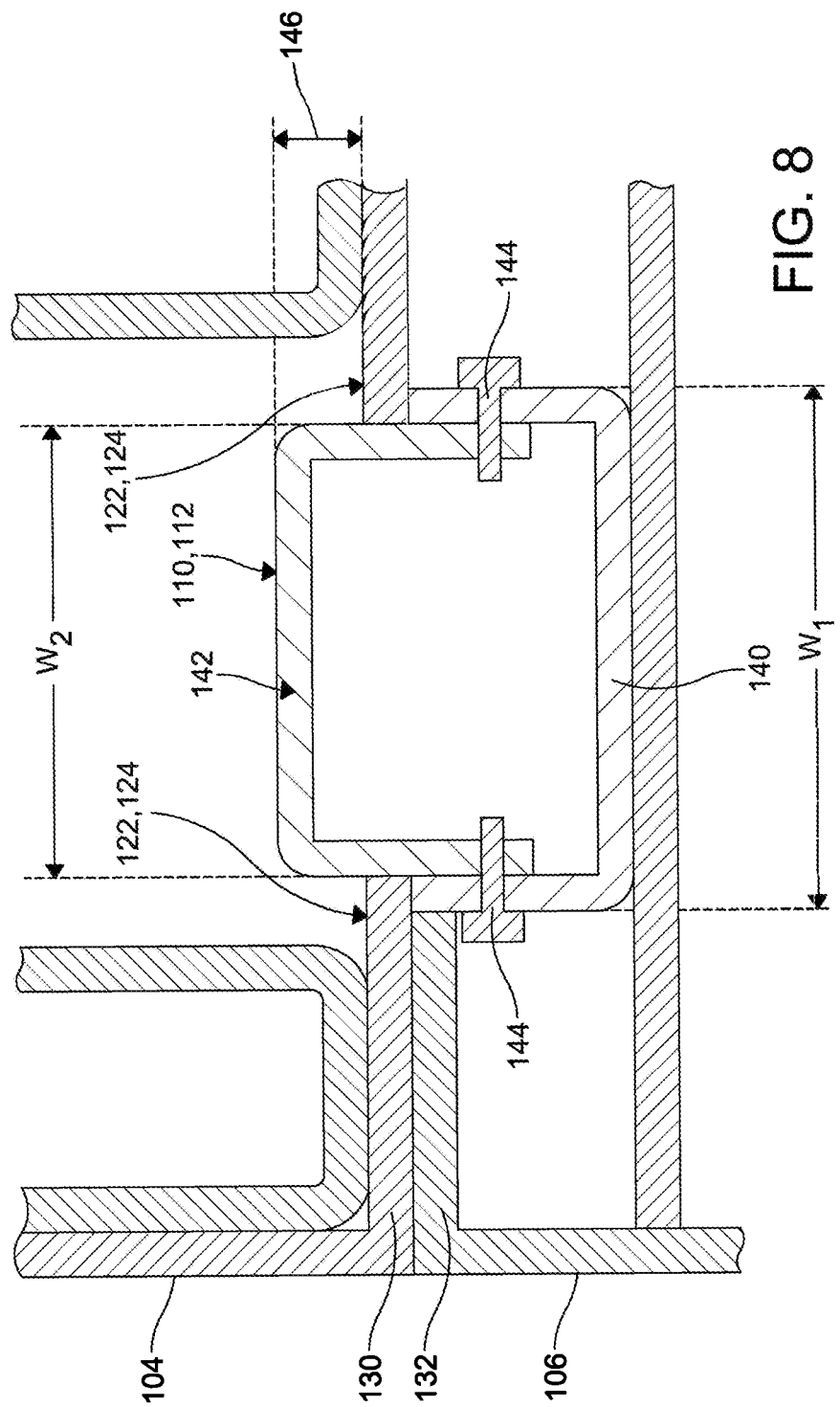
Figure 9:
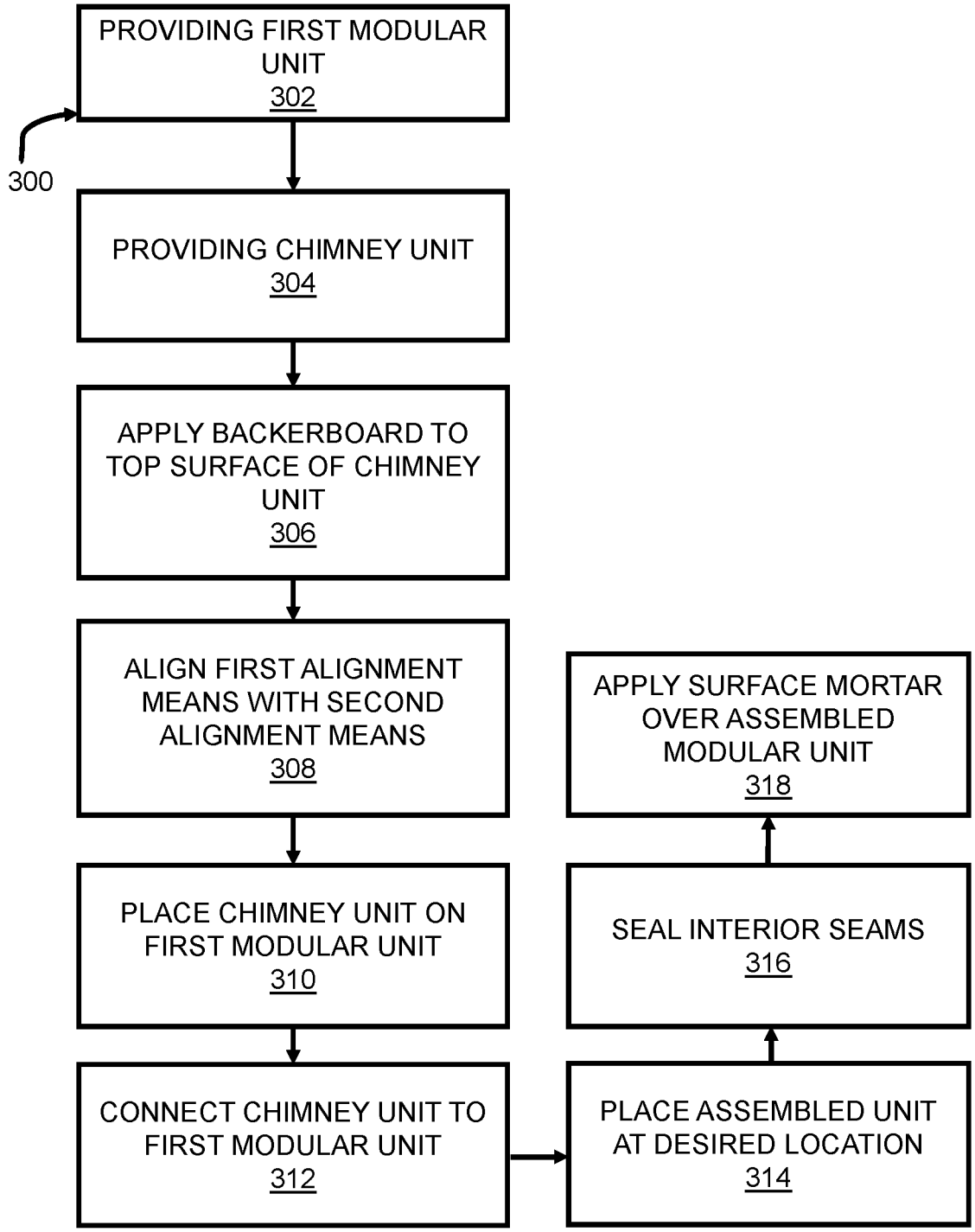

FIG. 8 is an enlarged fragmentary cross-sectional front elevational view of the modular outdoor fireplace and brick oven taken at section lines C-C and D-D in FIG. 5, and showing a first alignment means of the first modular unit in communication with a second alignment means of the chimney unit at section line C-C, and a third alignment means of the second modular unit in communication with a fourth alignment means of the first modular unit at section line D-D; and FIG. 9 is a flowchart diagram showing a method for constructing the modular system, according to one embodiment of the disclosure.

DETAILED DESCRIPTION

The following detailed description and appended drawings describe and illustrate various embodiments of the invention. The description and drawings serve to enable one skilled in the art to make and use the invention and are not intended to limit the scope of the invention in any manner. In respect of the methods disclosed, the order of the steps presented is exemplary in nature, and thus, is not necessary or critical unless otherwise disclosed.

As shown in FIGS. 1-8, a modular system 100 includes a chimney unit 102 and a first modular unit 104. The modular system 100 may also include a second modular unit 106 in certain examples.

Figure 1:
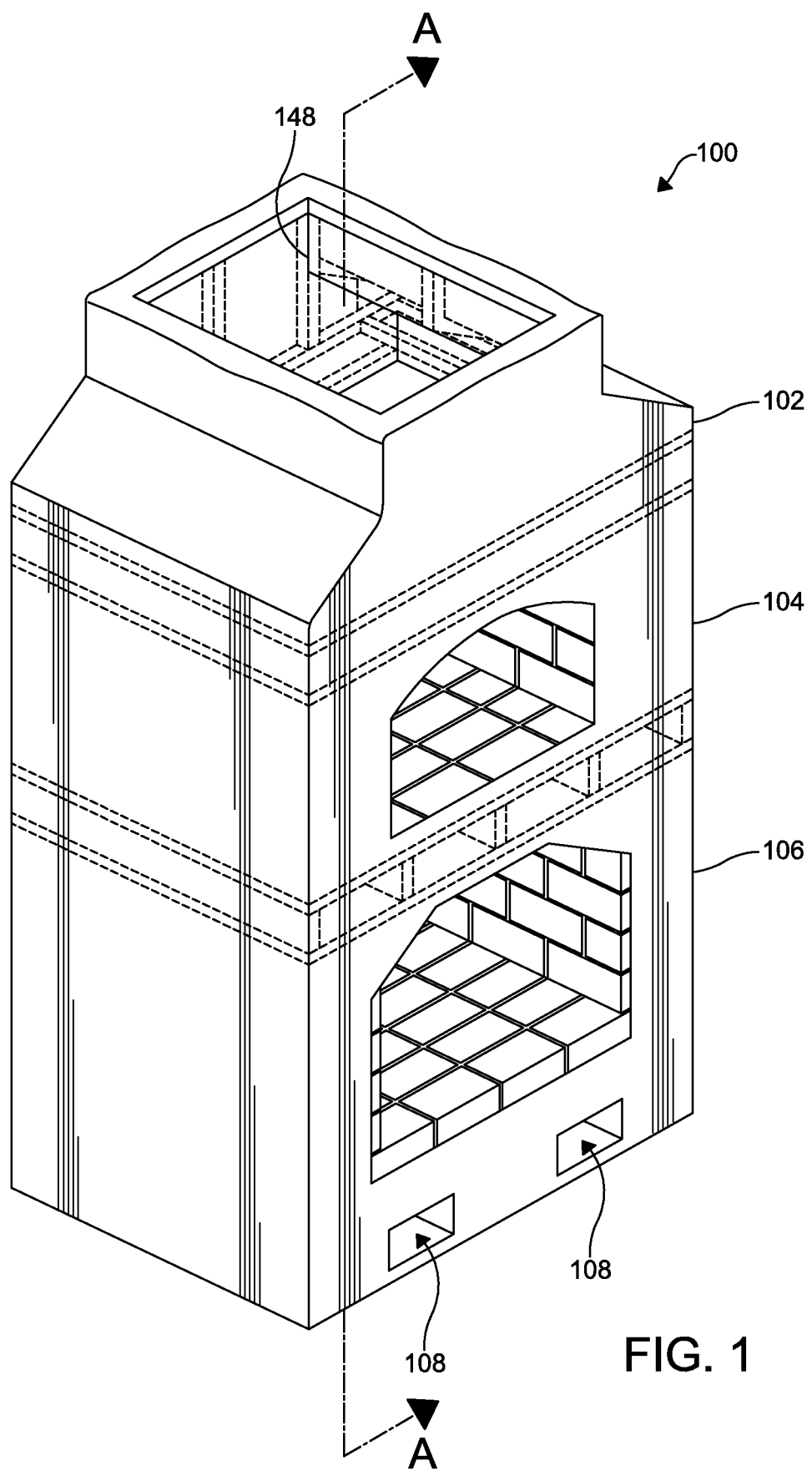
FIG. 1 is a front perspective view of a modular outdoor fireplace and brick oven system, according to one embodiment of the present disclosure, and showing a chimney unit, a first modular unit, and a second modular unit assembled, and further showing by phantom lines underlying frame structure.

It should be understood that, within the scope of the present disclosure, the first modular unit 104 may be one of a fireplace unit and an oven unit, as non-limiting examples. In particular, as shown in FIG. 1, the first modular unit 104 may be the oven unit 104 on which the chimney unit 102 is disposed. Additionally, the second modular unit 106 may be the fireplace unit on which the oven unit 104 is disposed upon assembly. Although FIG. 1 shows the employment of both the fireplace unit and the oven unit, a skilled artisan will appreciate that the modular system 100 of the present disclosure may be assembled with only the chimney unit and one of the fireplace unit or the oven unit as the first modular unit 104, as desired.

More particularly, and in certain embodiments (not shown), the chimney unit 102 may be disposed on a top surface 113 of the fireplace unit as the first modular unit 104. In other embodiments (not shown), the chimney unit 102 may be disposed on the top surface 113 of the oven unit as the first modular unit 104 without a further fireplace unit. In yet another embodiment, as shown in FIGS. 1-2, the chimney unit 102 may be disposed on the top surface 109 of the oven unit as the first modular unit 104, which is further disposed on the top surface 113 of the fireplace unit as the second modular unit 106.

Figure 2:
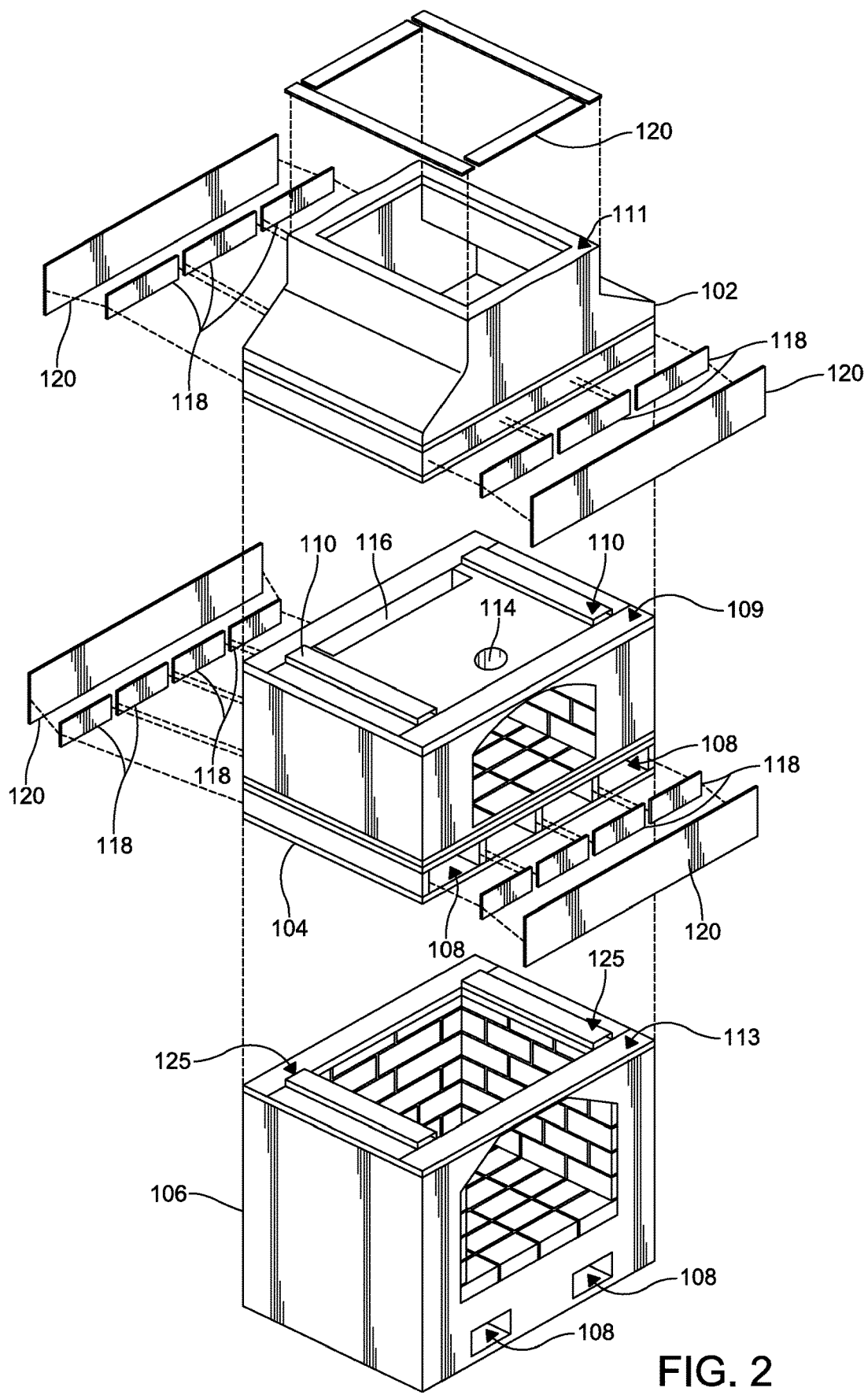
FIG. 2 is an exploded front perspective view of the modular outdoor fireplace and brick oven system shown in FIG. 1, and illustrating separated the chimney unit, the first modular unit with a first alignment means, and the second modular unit with a fourth alignment means.

Referring now to FIGS. 2 and 5, the first modular unit 104 has a main body 107 with a top surface 109. The main body 107 may be manufactured from refractory or fire-resistant materials such as metal and brick as non-limiting examples. In particular, and as described further herein, the main body 107 may be formed from a first modular unit frame (identified as 130 in FIG. 8). It should be appreciated that a skilled artisan may select other suitable fire-resistant or refractory materials to construct the main body 107, as desired.

As shown in FIGS. 2 and 8, the top surface 109 of the first modular unit 104 has a first alignment means 110. As described below in further detail, the first alignment means 110 is configured to assist a user in aligning modules of the modular system 100 during assembly. In particular examples, as also shown in FIGS. 2 and 8, the first alignment means 110 is a first male component. In a more specific example, the first male component is a raised elongate hollow beam. Other suitable structure for the first alignment means 110 may also be selected by a skilled artisan within the scope of the present disclosure.

Figure 3:
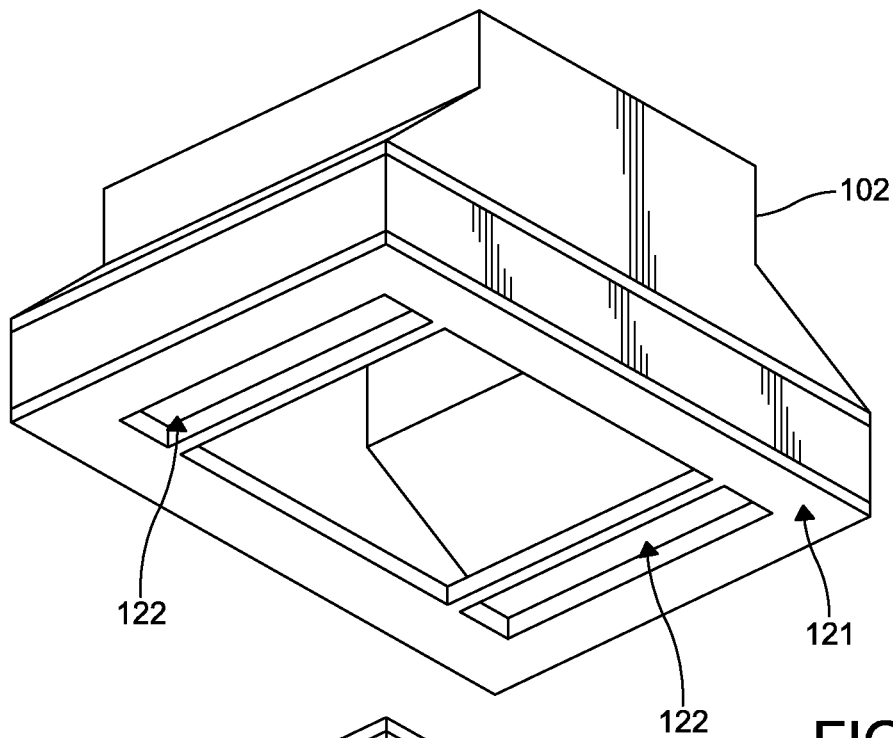
FIG. 3 is a bottom perspective view of the chimney unit of the modular outdoor fireplace and brick oven system shown in FIG. 1, further illustrating the chimney unit with a second alignment means.
Figure 4:
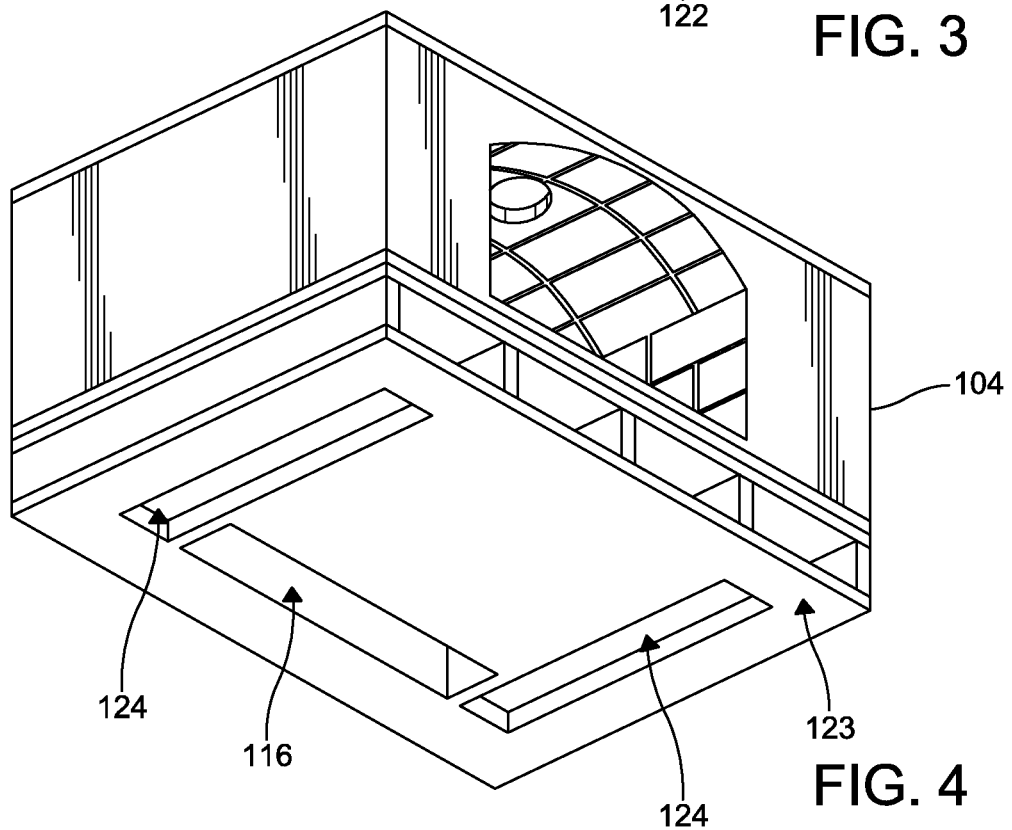
FIG. 4 is a bottom perspective view of the oven unit of the modular outdoor fireplace and brick oven system shown in FIG. 1, and depicting the first modular unit with a third alignment means.

With continued reference to FIGS. 3 and 8, the chimney unit 102 has a bottom surface 121 with a second alignment means 122. The second alignment means 122 is designed to cooperate with the first alignment means 110 of the first modular unit 104. The first alignment means 110 and the second alignment means 122 cooperate to hold the chimney unit 102 in a predetermined aligned position relative to the first modular unit 104 upon assembly.

It should be appreciated that the predetermined aligned position of the first and second alignment means 110, 122 is used to guide the assembly of the chimney unit 102 with the first modular unit 104. Additionally, once the chimney unit 102 and the first modular unit 104 are assembled and interlocked in the predetermined aligned position, the first and second alignment means 110, 122 militate against a lateral movement of the chimney unit 102 relative to the first modular unit 104 before the chimney unit 102 and the first modular unit 104 can be mechanically affixed by additional means, as described further herein.

In a more particular example, the second alignment means 122 includes a first female component. The first female component is designed to receive the first male component. In a more specific embodiment, the first female component is an elongate recess. The elongate recess may be further defined by a gap between frame members at the bottom surface 121 of the chimney unit 102. It should be appreciated that a skilled artisan may select other suitable structures and shapes to form the second alignment means 122, as desired.

In a further embodiment, as depicted in FIG. 2, the first alignment means 110 may also include a second male component. The second male component is spaced apart from the first male component on the top surface 109 of the first modular unit 104. Likewise, the second alignment means 122 may also include a second female component. The second female component is spaced apart from the first female component on the bottom surface 121 of the chimney unit 102. The second female component is designed to cooperate with the second male component to hold the chimney unit 102 in a predetermined aligned position relative to the first modular unit 104. It should be appreciated that a skilled artisan may use any other number of alignment means within the scope of the disclosure.

Referring now to FIGS. 5-8, the main body 107 of the first modular unit 104 further has a first modular unit frame 130 formed form a plurality of interconnected metal beams. The first alignment means 110, for example, the raised elongate hollow beam, may be attached to the top surface 109 of the first modular unit frame 130. In a further embodiment, the raised elongate hollow beam extends outwardly from the top surface 109 of the first modular unit 104 by a first distance 146. In an even more particular embodiment, the first distance 146 is about ⅜", which has been found to be particularly suitable for both the alignment and affixing the various modules of the modular system 100. One of ordinary skill in the art may select other suitable dimensions for the first distance 146, as desired.

In an exemplary example, shown in FIG. 8, the first alignment means 110 is the raised elongate hollow beam formed from a first U-shaped channel 140 and a second U-shaped channel 142. The first U-shaped channel 140 has a first opening with a first width W1. The second U-shaped channel 142 has a second opening and a second width W2.

The first width W1 is greater than the second width W2. The first opening faces the second opening. The first U-shaped channel 140 is designed to receive the second U-shaped channel 142. The first U-shaped channel 140 is further attached to the second U-shaped channel 142 with the use of one or more fasteners 144. In particular, the beams of the first modular unit frame 130 and the first and second U-shaped channels 140, 142 may be formed from 18-gauge galvanized steel. It should be appreciated that a skilled artisan may select other materials, dimensions, and shapes to form and connect the first alignment means 110 to the first modular unit frame 130, as desired.

As described hereinabove, and as illustrated in FIGS. 1-2 and 5-8, the chimney unit 102 is disposed atop the first modular unit 104. The chimney unit 102 has a main body 127. The main body 127 may be defined by a chimney unit frame 128, for example, which is in turn formed from a plurality of interconnected metal beams. The main body 127 of the chimney unit 102 may be constructed from fire-resistant or refractory materials such as metal or brick, as non-limiting examples. An interior portion of the chimney unit 102 may further be lined with sheet metal 129, as shown in FIGS. 1 and 5. It should be appreciated that a skilled artisan may select other suitable fire-resistant or refractory materials to construct the chimney unit frame 128, as desired.

In certain embodiments, and as also set forth hereinabove, the modular system 100 includes the second modular unit 106. In a specific example, as shown in FIGS. 1-2, 5, and 7, the first modular unit 104 is the oven unit and the second modular unit 106 is the fireplace unit.

Where the first modular unit 104 is the oven unit and the second modular unit 106 is the fireplace unit, a top surface 113 of the second modular unit 106 may be disposed on a bottom surface 123 of the first modular unit 104, as shown in FIGS. 2-4, and 9. In this example, the bottom surface 123 of the first modular unit 104 has a third alignment means 124 that cooperates with a fourth alignment means 125 on the top surface 113 of the second modular unit 106. The third alignment means 124 and the fourth alignment means 125 are designed to hold the first modular unit 104 in a predetermined aligned position relative to the second modular unit 106 upon assembly.

It should be appreciated that the predetermined aligned position of the third and fourth alignment means 124, 125 is used to guide the assembly of the first modular unit 104 with the second modular unit 106. Additionally, once the first modular unit 104 and the second modular unit 106 are assembled and interlocked in the predetermined aligned position, the third and fourth alignment means 124, 125 militate against a lateral movement of the first modular unit 104 relative to the second modular unit 106 before the first modular unit 104 and the second modular unit 106 can be mechanically affixed by additional means, as described further herein.

In a specific embodiment, as shown in FIG. 2, the first alignment means 110 and the second alignment means 122 are, upon assembly, each disposed between a front face 115 of the modular system 100 and a rear face 117 of the modular system 100. The first and second alignment means 110, 122 are further oriented such that ends of the first and second alignment means 110, 122 are disposed adjacent one of the front face 115 and the rear face 117 of the modular system. A skilled artisan may select different but suitable placements and orientations for the first and second alignment means 110, 122, as desired.

Figure 7:
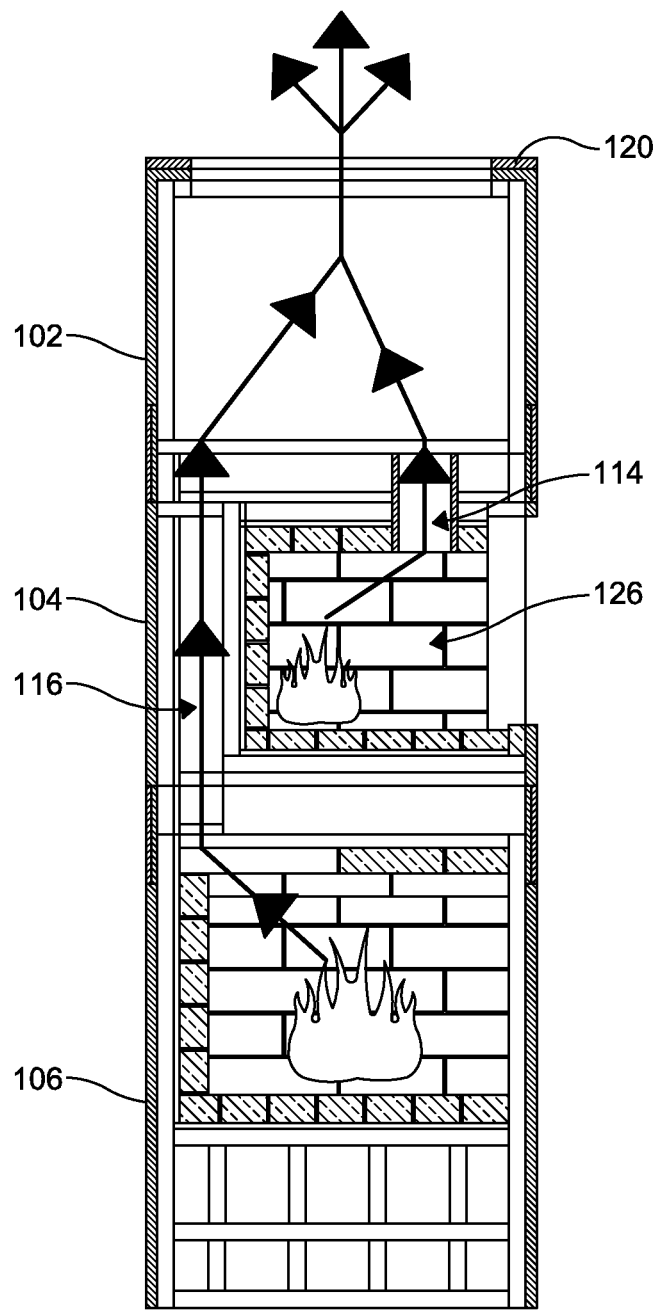
FIG. 7 is a cross-sectional side elevational view of the modular outdoor fireplace and brick oven system taken at section line A-A in FIG. 1, with indication arrows representing a first airflow pattern from the fireplace unit to the chimney unit and indication arrows representing a second airflow pattern from the oven unit to the chimney unit.

Referring now to FIG. 7, the modular system 100 upon assembly includes a first airflow channel 114 and a second airflow channel 116. The first airflow channel 114 directs heated air and smoke from the first modular unit 104 to the chimney unit 102 in operation. The second airflow channel 116 directs heated air and smoke from the second modular unit 106 to the chimney unit 102 in operation. Further, in operation the heated air and smoke from the first airflow channel 114 and the second airflow channel 116 may be combined within a chamber of the chimney unit 102 before being expelled to the atmosphere through a top of the chimney unit 102.

Where the first modular unit 104 is an oven unit, the oven unit may further have a cooking chamber 126. The cooking chamber 126 may be accessible from the front face 115 of the modular system 100. The cooking chamber 126 may include a domed ceiling. The domed ceiling may be fabricated from refractory bricks disposed in an arch. Advantageously, the domed ceiling may trap and radiate heat into the cooking chamber 126 providing optimized temperatures when cooking. One skilled in the art may select other suitable structures for the cooking chamber 126 within the present disclosure.

As shown in FIG. 7, the second airflow channel 116 may be defined by a gap between a rear wall of the cooking chamber 126 and the rear face 117 of the modular system 100. In this manner, the second airflow channel 116 bypasses the cooking chamber 126 and the heated air and smoke from the second unit 106 is directed directly to the chimney unit 102.

With further reference to FIG. 7, the first airflow channel 114 directs the heated air and smoke from the first modular unit 104 to the chimney unit 102. Where the first modular unit 104 is the oven unit, the first airflow channel 114 may be further defined as either a hollow column or chimney pipe 116 that extends from the cooking chamber 126 to the top surface 109 of the first modular unit 104, for example, as shown in FIG. 2. A top of the chimney pipe 116 is then in fluid communication with an aperture in the bottom surface 121 of the chimney unit 102, which aperture is aligned with the chimney pipe 116 upon assembly of the modular system 100.

As shown in FIGS. 1-4, the chimney unit 102, the first modular unit 104, and the second modular unit 106 are each easily lifted and maneuvered. The lifting may be facilitated by features that that allow for easy lifting and maneuverability. For example, the chimney unit 102, the first modular unit 104, and the second modular unit 106 may have a plurality of holes 108. In a specific embodiment, the plurality of holes 108 may be constructed out of box iron channels. The plurality of holes 108 are designed to receive at least one of a forklift, a sling, and straps for lifting and positioning the units of the modular system 100. It should be appreciated that one skilled in the art may utilize other suitable means for lifting and positioning the units of the modular system 100, within the scope of this disclosure.

In an additional embodiment, the chimney unit 102 may be provided without a plurality of holes 108. Advantageously, the chimney unit 102 without the plurality of holes 108 for lifting provides less obstruction and better airflow from at least one of a first modular unit 104 and a second modular unit 106.

It should be further appreciated that the modular system 100 may be in the form of a kit. The modular system kit may include a first modular unit 104 and a chimney unit 102, separate from each other as provided, and associated fastening means for connecting the chimney unit 102 and the first modular unit 104 upon assembly.

As detailed hereinabove, the first modular unit 104 in the kit may be at least one of a fireplace unit and an oven unit. The first modular unit includes the main body 107 with the top surface 109. The top surface 109 of the first modular unit 104 has the first alignment means 110. As further explained herein, the first alignment means 110 is configured to assist the user in aligning the modular system 100.

The chimney unit 102 in the kit has the bottom surface 121. The bottom surface 121 of the chimney unit 102 further has the second alignment means 122. The first alignment means 110 of the first modular unit 104 is configured for cooperating with the second alignment means 122 of the chimney unit 102. The first alignment means 110 and the second alignment means 122 are designed to hold the chimney unit 102 in the predetermined aligned position relative to the first modular unit 104, where the kit is assembled.

Now referring to FIG. 9, a method 300 for constructing the modular system 100 is shown. The method 300 includes a first step 302 of providing the first modular unit 104. A second step 304 involves providing the chimney unit 102. Next, a third step 306 includes applying a backerboard 120 to the top surface 111 of the chimney unit 102. Then, a fourth step 308 includes aligning the first alignment means 110 with the second alignment means 122. Following, a fifth step 310 involves placing the chimney unit 102 on the top surface 109 of the first modular unit 104, in the predetermined aligned position relative to the first modular unit 104.

Figure 6:
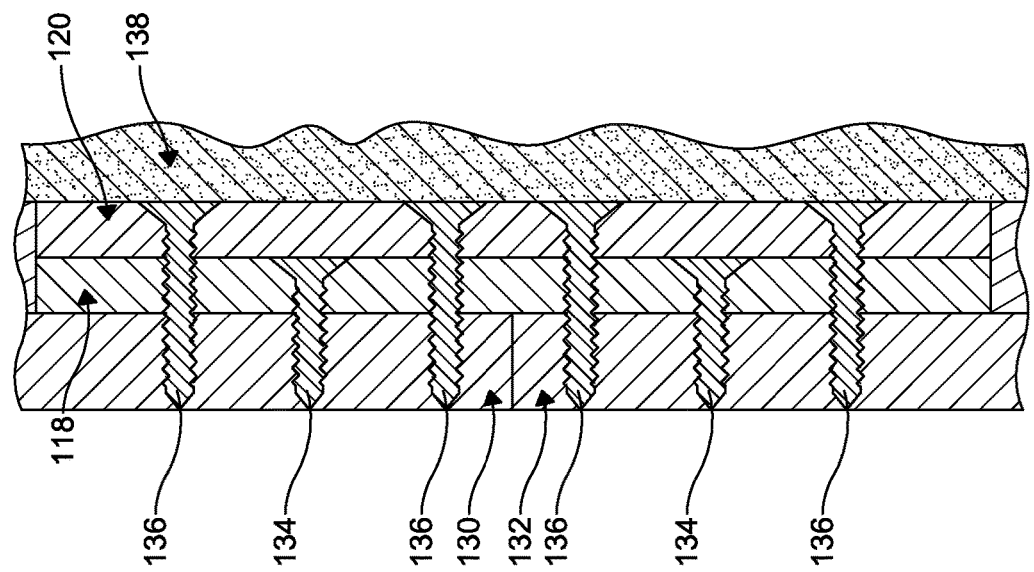
FIG. 6 is an enlarged fragmentary cross-sectional side elevational view taken at callout B in FIG. 5, and further showing a connector plate and a backer board connected to a steel frame of the first modular unit and a steel frame of the second modular unit.

A sixth step 312 may further include connecting the chimney unit 102 to the first modular unit 104. As shown in FIGS. 2 and 5-7, to connect the chimney unit 102 to the first modular unit, at least one connector plate 118 may be disposed between the chimney unit frame 128 and the first modular unit frame 130. In a particular embodiment, as shown in FIG. 6, at least one connector plate 118 is disposed on the front face 115 and at least one connector plate 118 is disposed on the rear face 117 of the modular system 100. The at least one connector plate 118 may be attached to the chimney unit frame 128 and the first modular unit frame 130 by using a plurality of connector plate fasteners 134. In a specific embodiment, the plurality of connector plate fasteners 134 may include screws, bolts, rivets, and the like. The connector plate 118 may be formed from steel, as a non-limiting example. It should be appreciated that a skilled artisan may select other suitable fasteners for attaching the connector plates 118, as well as other suitable materials for the connector plates 118, as desired.

As also shown in FIGS. 2 and 5-7, to connect the chimney unit 102 to the first modular unit, at least one backerboard 120 must be disposed atop the at least one connector plate 118. In a specific example, as also shown in FIG. 6, at least one backerboard 120 is disposed atop the connector plates 118 on the front face 115 and the rear face 117 of the modular system 100. The at least one backerboard 120 may be connected to the connector plate 118 by using a plurality of backerboard fasteners 136. In a particular example, the plurality backerboard fasteners 136 may include screws, bolts, rivets, and the like. The backerboards 120 may be formed from magnesium oxide boards, as a non-limiting example, due to their refractory properties. It should be appreciated that a skilled artisan may select other suitable fasteners for attaching the backerboards 120, as well as other suitable materials for the backerboards 120 within the scope of the present disclosure.

The method 300 further includes a seventh step 314, which includes placing the assembled modular system 100 at a desired location. Next, in an eighth step 316, a plurality of interior seams 148 of the modular system 100 are sealed. In a specific embodiment, the interior seams 148 are sealed with MILL-PAC™ sealant, commercially available from IGS Industries in Meadow Lands, Pa., USA. It should be appreciated that a one skilled in the art may select other suitable sealants for sealing the interior seams 148, as desired.

Additionally, as shown in FIGS. 1 and 5-7, the method 300 may include a ninth step 318 of applying a surface mortar 138 over the assembled modular unit system 100. In a particular embodiment, the surface mortar 138 may be further defined as a stucco material. It should be appreciated that a skilled artisan may use other suitable applications or materials to cover the modular unit system 100 within the scope of the present disclosure.

Advantageously, the modular system 100 and the method 300 as described herein is useful for the construction of a modular outdoor fireplace and oven combination. The modular system 100 and the method 300 is customizable to the needs of the user. Furthermore, being modular and provided as the kit for later assembly, the modular system 100 and the method 300 is configured to be easily transportable and assembled without requiring the intervention of a skilled craftsman.

While certain representative embodiments and details have been shown for purposes of illustrating the invention, it will be apparent to those skilled in the art that various changes may be made without departing from the scope of the disclosure, which is further described in the following appended claims.

What is claimed is:

1. A modular system, comprising:
   a first modular unit including a main body with a top surface, the top surface having first alignment means, wherein the first modular unit is at least one of a fireplace unit and an oven unit; and
   a chimney unit disposed atop the first modular unit, the chimney unit having a bottom surface with second alignment means, the first alignment means of the first modular unit cooperating with the second alignment means of the chimney unit and holding the chimney unit in a predetermined aligned position relative to the first modular unit,
   wherein the first alignment means includes a first male component and the second alignment means includes a first female component, the first female component receiving the first male component,
   wherein the first male component is a raised elongate hollow beam and the first female component is an elongate recess, and
   wherein the raised elongate hollow beam includes a first U-shaped channel having a first opening with a first width, and a second U-shaped channel having a second opening with a second width, the first width being greater than the second width and the first opening facing the second opening, the first U-shaped channel receiving the second U-shaped channel.

2. The modular system of claim 1, further comprising a second modular unit, the first modular unit being the oven unit and the second modular unit being the fireplace unit.

3. The modular system of claim 2, wherein the chimney unit is disposed on the top surface of the oven unit, which is further disposed on the top surface of the fireplace unit.

4. The modular system of claim 2, wherein the first modular unit has a bottom surface with third alignment means, and the second modular unit has a top surface with fourth alignment means, the third alignment means of the first modular unit cooperating with the fourth alignment means of the second modular unit and holding the first modular unit in a predetermined aligned position relative to the second modular unit.

5. The modular system of claim 1, wherein the raised elongate hollow beam extends outwardly from the top surface of the first modular unit by a first distance.

6. The modular system of claim 5, wherein the first distance is about ⅜".

7. The modular system of claim 1, wherein the first modular unit has a first modular unit frame, and the raised elongate hollow beam is attached to a top of the first modular unit frame.

8. The modular unit of claim 7, wherein the chimney unit has a chimney unit frame, and the elongate recess is defined by a gap between frame members at a bottom of the chimney unit frame.

9. The modular system of claim 1, wherein the first alignment means also includes a second male component, the second male component spaced apart from the first male component on the top surface of the first modular unit, and the second alignment means also includes a second female component, the second female component spaced part from the first female component on the bottom surface of the chimney unit.

10. The modular system of claim 1, further comprising a fastener that connects the raised U-channel to the upright U-channel framing member.

11. The modular system of claim 1, wherein the first alignment means and the second alignment means are oriented from a front face of the modular system to a rear face of the modular system.

12. The modular system of claim 1, wherein the chimney unit is disposed on the top surface of the fireplace unit.

13. The modular system of claim 1, wherein the chimney unit is disposed on the top surface of the oven unit.

14. The modular system of claim 1, further comprising a plurality of holes disposed in at least one of the first modular unit and the second modular unit configured to receive at least one of forklifts, slings, and straps for lifting and positioning the modular unit.

15. A modular system kit comprising:
a first modular unit including a main body with a top surface, the top surface having first alignment means, wherein the first modular unit is at least one of a fireplace unit and an oven unit; and
a chimney unit configured to be disposed atop the first modular unit, the chimney unit having a bottom surface with second alignment means, the first alignment means of the first modular unit configured for cooperating with the second alignment means of the chimney unit and holding the chimney unit in a predetermined aligned position relative to the first modular unit,
wherein the first alignment means includes a first male component and the second alignment means includes a first female component, the first female component receiving the first male component,
wherein the first male component is a raised elongate hollow beam and the first female component is an elongate recess, and
wherein the raised elongate hollow beam includes a first U-shaped channel having a first opening with a first width, and a second U-shaped channel having a second opening with a second width, the first width being greater than the second width and the first opening facing the second opening, the first U-shaped channel receiving the second U-shaped channel.

16. A method of forming a modular system, comprising the steps of:
providing a first modular unit including a main body with a top surface, the top surface having first alignment means, wherein the first modular unit is at least one of a fireplace unit and an oven unit;
providing a chimney unit configured to be disposed atop the first modular unit, the chimney unit having a top surface with a chimney vent formed therethrough, and a bottom surface with second alignment means, the first alignment means of the first modular unit configured for cooperating with the second alignment means of the chimney unit and configured for holding the chimney unit in a predetermined aligned position relative to the first modular unit;
applying a backerboard to the top surface of the chimney unit;
aligning the first alignment means of the first modular unit with the second alignment means of the chimney unit;
disposing the chimney unit on the top surface of the modular unit in the predetermined aligned position, whereby the first alignment means of the first modular unit cooperate with the second alignment means of the chimney unit, thereby forming the modular system;
fastening at least one connector plate to each of the chimney unit and the first modular unit with a plurality of connector plate fasteners, after the step of disposing the chimney unit on the top surface of the modular unit in the predetermined aligned position;
fastening at least one backer board atop the at least one connector plate with a plurality of backerboard fasteners;
sealing interior seams of the modular system; and
applying surface mortar to the modular system, the surface mortar disposed atop the least one backerboard.

* * * * *